United States Patent
Araki et al.

[11] Patent Number: 5,941,066
[45] Date of Patent: Aug. 24, 1999

[54] DEVICE FOR PURIFYING THE EXHAUST GAS OF AN INTERNAL COMBUSTION ENGINE

[75] Inventors: Yasushi Araki, Susono; Yoshimitsu Henda, Numazu; Yoshimasa Watanabe, Sunto-gun, all of Japan

[73] Assignee: Toyota Jidosha Kabushiki Kaisha, Aichi, Japan

[21] Appl. No.: 08/927,463

[22] Filed: Sep. 11, 1997

[30] Foreign Application Priority Data

Sep. 19, 1996 [JP] Japan .................................. 8-248145

[51] Int. Cl.⁶ ...................................................... F01N 5/04
[52] U.S. Cl. ........................... 60/280; 60/288; 60/291; 60/295; 60/311; 55/DIG. 30; 55/284
[58] Field of Search ........................ 60/280, 287, 288, 60/291, 295, 297, 311; 55/DIG. 30, 283, 284

[56] References Cited

U.S. PATENT DOCUMENTS

| | | |
|---|---|---|
| 4,702,075 | 10/1987 | Jenny ............................................ 60/288 |
| 5,123,243 | 6/1992 | Baddour ....................................... 60/295 |
| 5,253,476 | 10/1993 | Levendis et al. ............................ 60/311 |
| 5,426,936 | 6/1995 | Levendis et al. ............................ 60/288 |
| 5,616,171 | 4/1997 | Barris et al. ................................ 55/302 |

FOREIGN PATENT DOCUMENTS

| | | |
|---|---|---|
| A-0072059 | 2/1983 | European Pat. Off. . |
| A-59-74319 | 4/1984 | Japan . |
| A-64-77718 | 3/1989 | Japan . |
| A-4-31613 | 2/1992 | Japan . |
| A-4-31614 | 2/1992 | Japan . |
| A-4-103867 | 4/1992 | Japan . |
| A-8-28247 | 1/1996 | Japan . |

Primary Examiner—Thomas E. Denion
Attorney, Agent, or Firm—Oliff & Berridge, PLC

[57] ABSTRACT

A device for purifying the exhaust gas of an internal combustion engine is disclosed. The device comprises a collision collecting type filter for collecting particulates which is arranged in an exhaust passage, can vary a pressure in the exhaust passage on at least one of the upstream side and downstream side of said filter, determines that the collected particulates have been burned and the filter has been regenerated, and suddenly changes the pressure in the exhaust passage when it is determined that the filter has been regenerated.

10 Claims, 7 Drawing Sheets

DEVICE FOR PURIFYING THE EXHAUST GAS OF AN INTERNAL COMBUSTION ENGINE

BACKGROUND OF THE INVENTION

1. Field of the Invention

The present invention relates to a device for purifying the exhaust gas of an internal combustion engine.

2. Description of the Related Art

Exhaust gas discharged from a Diesel engine contains a relatively large quantity of exhaust particulates, the principal component of which is carbon. Therefore, environmental pollution is caused by these exhaust particulates contained in the exhaust gas. Accordingly, it is preferable to remove these exhaust particulates before the exhaust gas is discharged from the engine into the atmosphere. In order to accomplish the above object, there is provided a filter to collect the particulates in the exhaust passage of a Diesel engine.

While the Diesel engine is operated, the quantity of particulates collected by the filter increases. In accordance with the increase in the quantity of particulates collected by the filter, the exhaust resistance is increased, so that the engine performance is deteriorated. In order to prevent the deterioration of the engine performance, particulates collected by the filter must be periodically burned so as to regenerate the filter.

In the process of combustion conducted in a Diesel engine, not only fuel but also engine oil, which has intruded into cylinders, is burned. Accordingly, oxides and sulfides of calcium and phosphorus, which are components of engine oil, are produced. Usually, particulates contain the thus produced oxides and sulfides. It is very difficult to burn the oxide and sulfide of calcium and phosphorus. Therefore, in the regeneration of the filter, the oxide and sulfide of calcium and phosphorus remain and accumulate on the filter in the form of ashes, so that the exhaust resistance of the filter is increased.

Japanese Unexamined Patent Publication No. 4-31613 discloses an exhaust gas processing device in which ashes are removed from the filter as follows. There is provided a bypass passage which bypasses the filter, and this bypass passage is connected with an exhaust passage on the upstream side of a branch point from which an exhaust gas recirculating passage branches. In this bypass passage, there is provided a first closing valve which is normally closed. Between the branch point of the exhaust gas recirculating passage and the branch point of the bypass passage in the exhaust passage, there is provided a second closing valve which is normally opened.

In this exhaust gas processing device, exhaust gas usually passes through the exhaust passage, and particulates are collected by the filter. When the temperature of exhaust gas is raised, the collected particulates are burned, so that the filter can be regenerated. In accordance with the progress of regeneration of the filter, once a quantity of ashes remaining in the filter is increased, the first closing valve is opened, and at the same time the second closing valve is closed. Due to the foregoing, exhaust gas flows into the bypass passage and reaches the downstream side of the filter in the exhaust passage. At this time, a negative pressure of the intake system acts in the exhaust passage on the upstream side of the filter via the exhaust gas recirculating passage. Accordingly, a back flow of exhaust gas is produced in the filter by the action of negative pressure. This exhaust gas processing device is intended to remove ashes from the filter by this back flow of exhaust gas. By the way, exhaust gas discharged from a spark ignition engine also contains the particulates so that such a filter can be arranged in the exhaust passage thereof.

It is possible to remove ashes from the filter by the above-mentioned exhaust gas processing device. However, the exhaust gas processing device requires two closing valves and a driving unit to drive them. Accordingly, the manufacturing cost is raised, and further the structure of the exhaust system becomes complicated.

SUMMARY OF THE INVENTION

Therefore, it is an object of the present invention to provide a device for purifying the exhaust gas of an internal combustion engine capable of removing ashes from a filter for collecting particulates simply.

According to the present invention, there is provided a device for purifying the exhaust gas of an internal combustion engine comprising:

a collision collecting type filter for collecting particulates which is arranged in an exhaust passage of said engine;

a pressure variable means which can vary a pressure in the exhaust passage on at least one of the upstream side or downstream side of the filter;

a regeneration determining means for determining that the collected particulates have been burned and the filter has been regenerated; and a pressure changing means for suddenly changing the pressure in the exhaust passage by the pressure variable means when it is determined that the filter has been regenerated by the regeneration determining means.

The present invention will be more fully understood from the description of preferred embodiments of the invention set forth below, together with the accompanying drawings.

BRIEF DESCRIPTION OF THE DRAWINGS

In the drawings:

FIG. 2 (A) is a view for showing the circumstances of collecting particulates in a collision collecting type filter.

FIG. 2 (B) is a view for showing the circumstances of removing ashes in the collision collecting type filter.

DESCRIPTION OF THE PREFERRED EMBODIMENT

Figure 1:
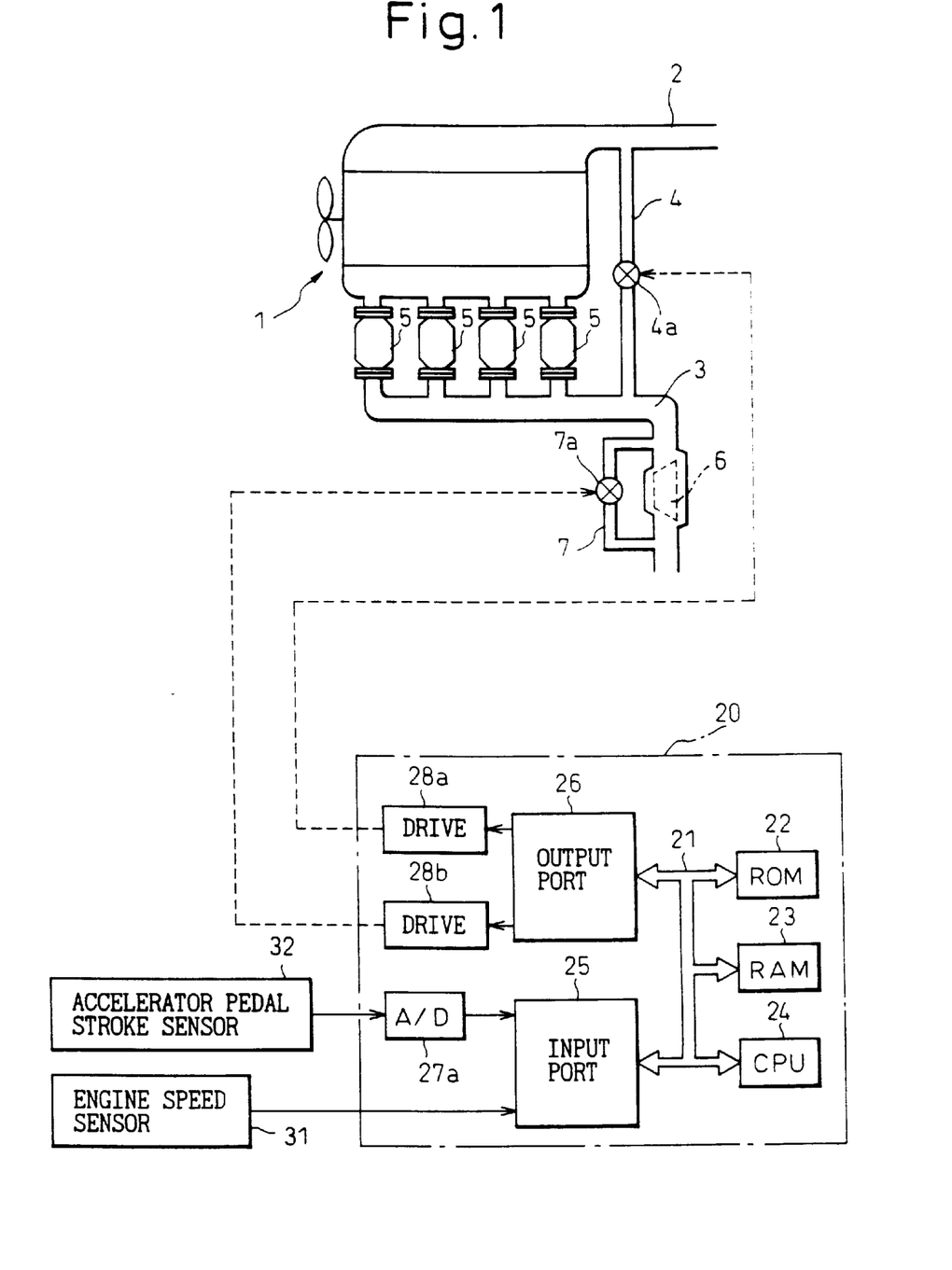
FIG. 1 is a schematic illustration of a diesel engine to which a device for purifying the exhaust gas of an internal combustion engine of the first embodiment of the present invention is attached.

FIG. 1 is a schematic illustration of a diesel engine to which the device for purifying the exhaust gas of the first embodiment of the present invention is attached. In FIG. 1, reference numeral 1 designates a 4-cylinder type diesel engine, reference numeral 2 designates an intake passage having a branch section to feed intake air to each cylinder, reference numeral 3 designates an exhaust passage having a confluence section to discharge exhaust gas from each cylinder into the atmosphere, and reference numeral 4 designates an exhaust gas recirculating passage to communicate the intake passage 2 on the upstream side of the branch section with the exhaust passage 3 on the downstream of the confluence section.

Thus, the intake passage 2 and the exhaust passage 3 are communicated with each other by the exhaust gas recirculating passage 4 arranged at a position close to the engine body, so that exhaust gas is recirculated into the cylinders by the action of a difference in pressure between the suction passage 2 and the exhaust passage 3. Since the primary component of exhaust gas is an inert gas, combustion temperatures in the cylinders are lowered by the large heat capacity of inert gas, so that a quantity of $NO_x$ produced in the cylinders can be reduced. In the exhaust gas recirculating passage 4, there is provided a first control valve 4a to control a quantity of exhaust gas to be recirculated.

On the upstream side of the confluence section of the exhaust passage 3, there is provided a filter 5 for each cylinder to collect particulates. In the exhaust passage 3, on the downstream side of the connecting section with the recirculating passage 4 of exhaust gas, there is provided a turbine 6 of a turbo-charger. Also, there is provided a bypass passage 7 to bypass this turbine 6. This bypass passage 7 is generally referred to as a waste gate passage, and the second control valve 7a is arranged in this waste gate passage. A quantity of exhaust gas passing through the bypass passage 7 is controlled by the second control valve 7a so that the turbine 6 can be prevented from rotating at an excessively high speed.

Reference numeral 20 designates an electronic control unit (ECU) to control a degree of opening of the first control valve 4a and also to control a degree of opening of the second control valve 7a.

The ECU 20 is constructed as a digital computer and includes a ROM (read only memory) 22, a RAM (random access memory) 23, a CPU (microprocessor, etc.) 24, an input port 25, and an output port 26. The ROM 22, the RAM 23, the CPU 24, the input port 25, and the output port 26 are interconnected by a bidirectional bus 21.

An engine speed sensor 32, which produces output pulses representing the engine speed, is connected to the input port 25. An accelerator pedal stroke sensor 31 produces an output voltage which is proportional to the movement of the accelerator pedal 33, i.e., the engine load, and this output voltage is input into the input port 25 via an AD converter 27a. The output port 26 is connected to the first control valve 4a via a drive circuit 28a. The output port 26 also is connected to the second control valve 7a via a drive circuit 28b.

Figure 2A:
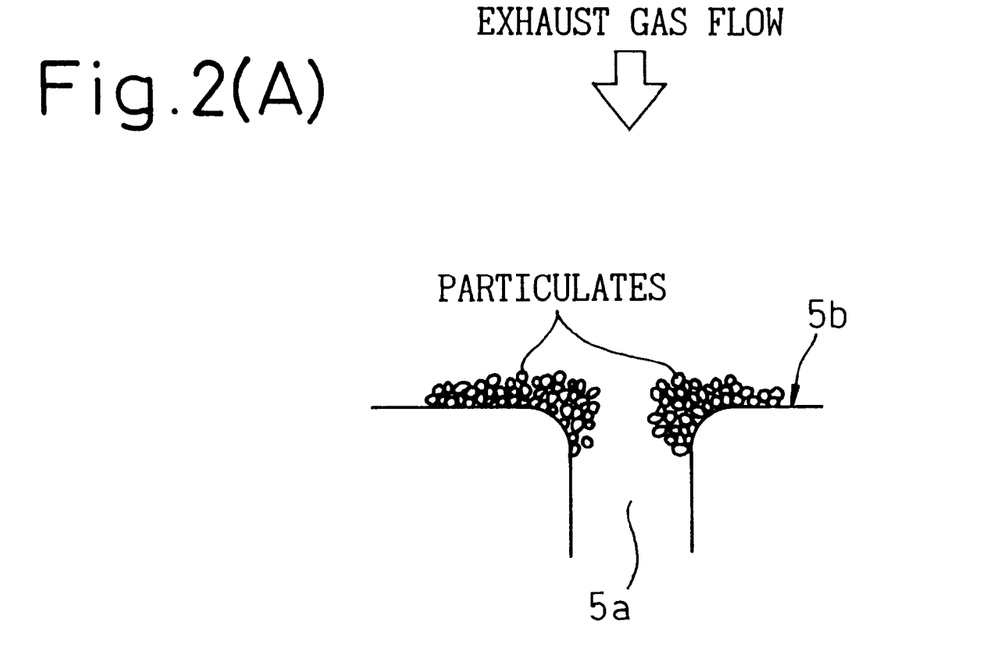
Figure 2B:
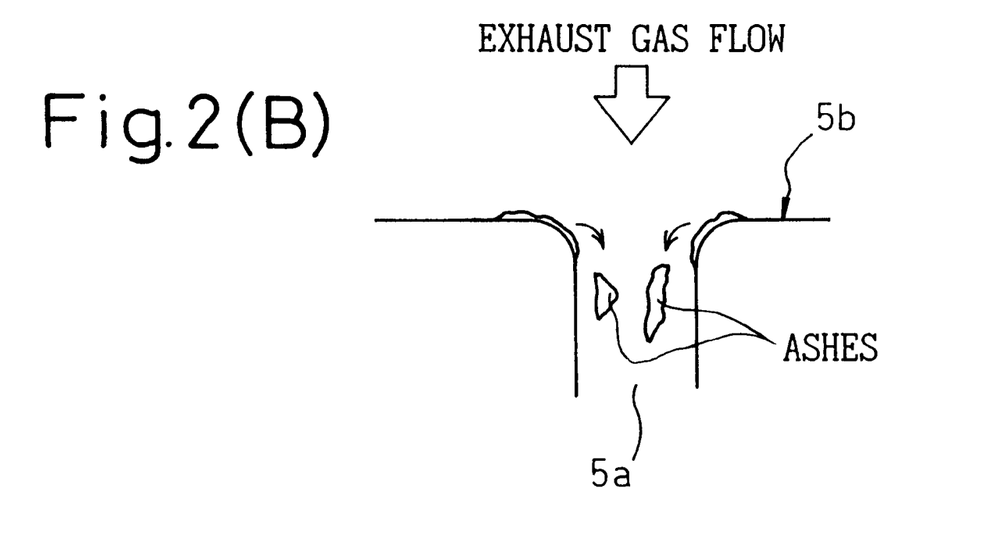

The filter 5 is a collision collecting type filter made of ceramic, metal, ceramic fiber, metallic non-woven fabric or inorganic fiber. As illustrated in FIG. 2, such a collision collecting type filter has meshes 5a relatively larger than the dimensions of particulates. This filter collects only particulates colliding with a wall surface 5b of the filter in the beginning of collecting particulates. In accordance with the progress of collection of particulates, as illustrated in FIG. 2(A), particulates accumulate in such a manner that the dimensions of meshes 5a of the filter 5 are reduced by the accumulating particulates, and thus the collecting ability of the filter increases. When a quantity of collected particulates is small, the collecting ability of the collision collecting type filter is not so high. However, the exhaust resistance of the filter is low in accordance with that, and further clogging of the filter seldom occurs. Therefore, the collision collecting type filter is suitable for practical use.

Particulates collected by each filter 5 are burned by the heat of the exhaust gas. Therefore, the meshes 5a of the filter 5 are not completely closed up by the accumulated particulate. In this embodiment, each filter 5 is arranged at a position close to the engine body. Accordingly, it is possible to effectively utilize the heat of exhaust gas for the combustion of particulates.

Thus, particulates are burned, so that combustible components contained in the particulates are removed from the filter 5. However, oxides or sulfides of calcium or phosphorus contained in the particulates cannot burn, and they accumulate on the filter in the form of ashes.

In the same manner as that of particulates, ashes accumulate on the filter 5 such that the dimensions of the meshes 5a of the filter 5 are reduced. Finally, the meshes 5a of the filter 5 are completely closed up, and the exhaust resistance is remarkably increased. As a result, the engine output is greatly lowered. In order to avoid this, it is necessary to remove the accumulated ashes from the filter 5. In this embodiment, to remove ashes from the filter 5, the control unit 20 operates in accordance with a first routine shown in FIG. 3.

Figure 3:
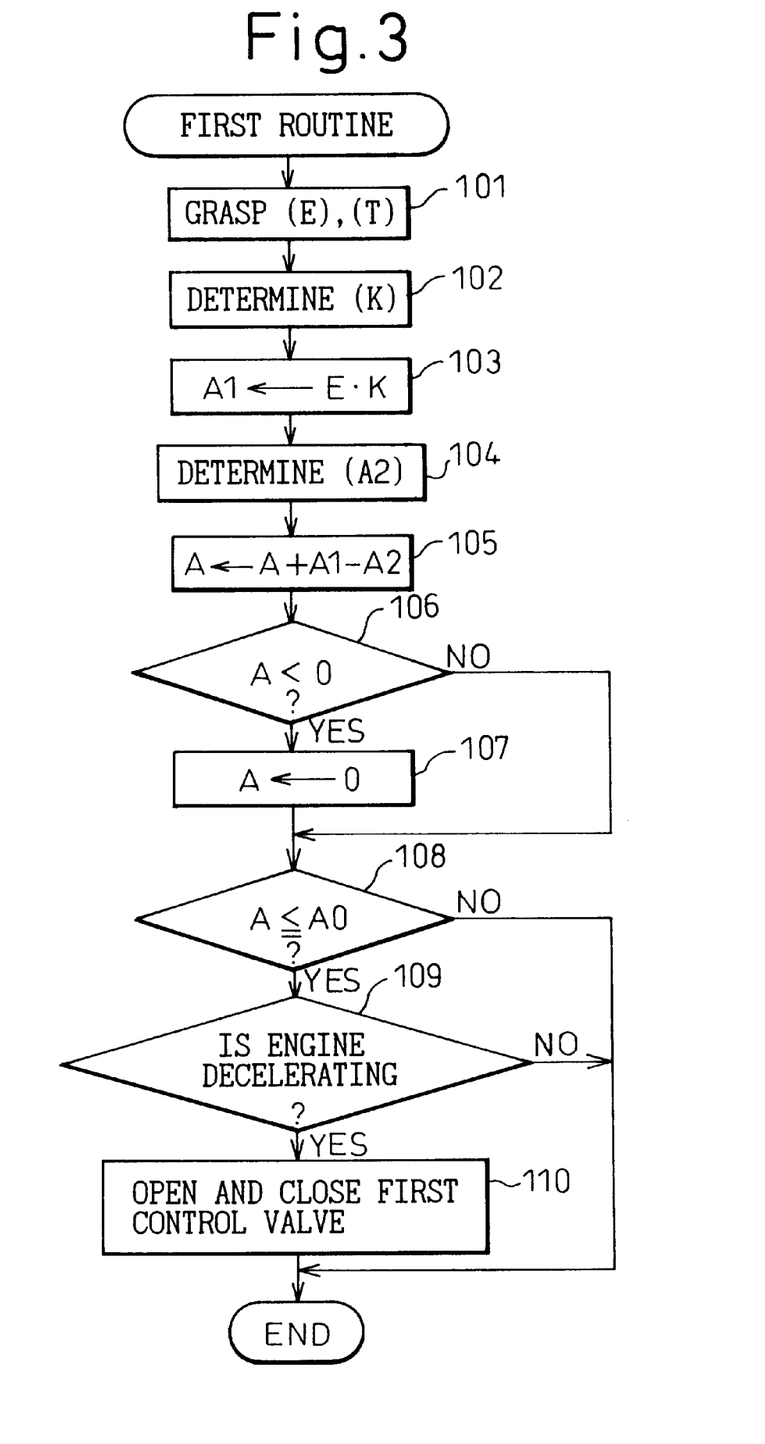
FIG. 3 is a first routine for removing ashes from the filter.
Figure 4:
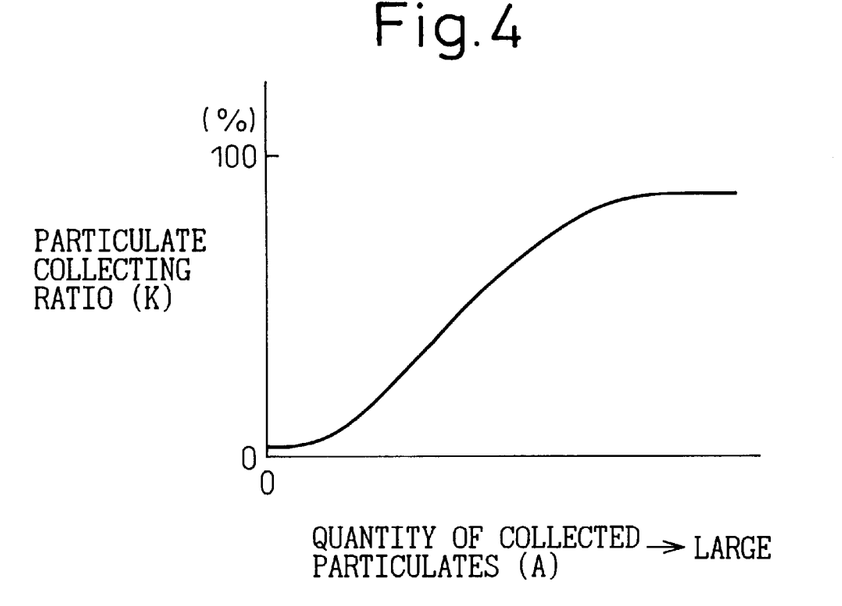
FIG. 4 is the first map for determining a particulate collecting ratio used for the first routine shown in FIG. 3.

First, at step 101, a current engine load L is detected by the acceleration pedal stroke sensor 31, and a current engine speed N is detected by the engine speed sensor 32, and on the basis of the detected engine load L and engine speed N, a quantity of particulates E discharged from each cylinder and temperature T of exhaust gas discharged from each cylinder during an executive interval of the routine are found by use maps on the like. Next, at step 102, on the basis of the quantity of particulates A collected by each filter 5 calculated at the last time, a current particulate collecting ratio K is determined by use a first map shown in FIG. 4. The collision collecting type filter 5 used in this embodiment, as described before, is such that the larger the quantity of collected particulates becomes, the more easily particulates can be collected, i.e., the larger the particulate collecting ratio becomes.

Figure 5:
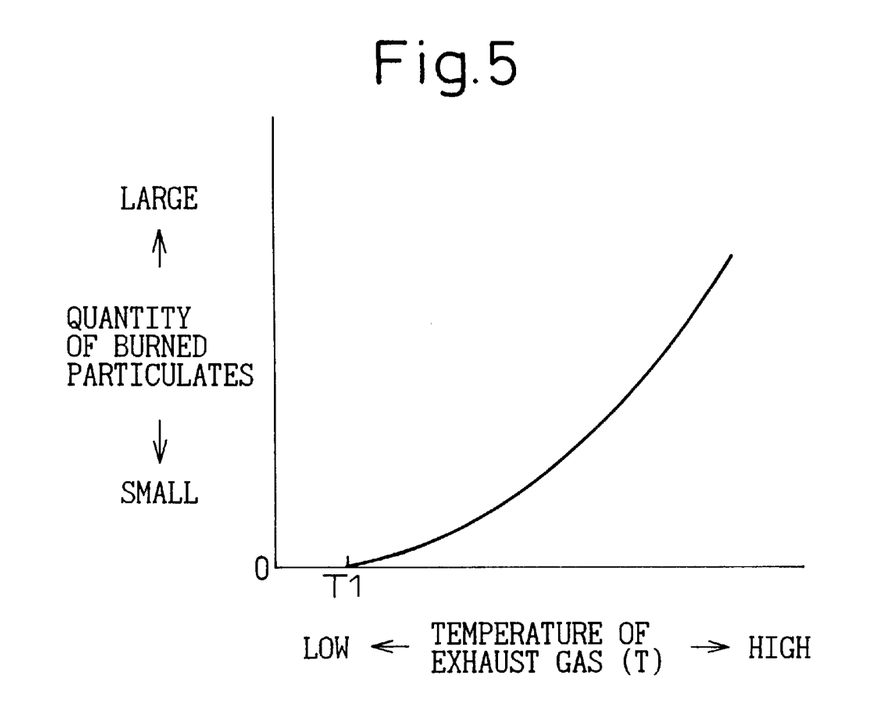
FIG. 5 is the second map for determining a quantity of burned particulates used for the first routine shown in FIG. 3.

Next, at step 103, the quantity of discharged particulates E is multiplied by the particulate collecting ratio K, so that a further quantity of particulates A1 collected by each filter 5 at this time can be calculated. Then, the routine goes to step 104. At step 104, on the basis of the current exhaust gas temperature T, a quantity of particulates A2 burned in each filter during the executive interval of the routine is determined by use a second map shown in FIG. 5. The quantity of particulates A2 burned in each cylinder is zero when the exhaust gas temperature T is not higher than the predetermined temperature T1. However, when the exhaust gas temperature T becomes higher than the predetermined temperature T1, the higher the exhaust gas temperature T becomes, the larger the quantity of particulates A2 burned in each cylinder becomes.

Next, the routine goes to step 105. At step 105, a current quantity of particulates A collected by each filter 5 is calculated as follows. The further quantity of particulates A1 calculated at step 103 is added to the quantity of particulates A at the last time, and the quantity of burned particulates A2 determined in step 104 is subtracted from it. When the engine is operated at high speed, the quantity of burned particulates A2 is increased. Therefore, when the engine continues to be operated at high speed, the quantity of collected particulates becomes a value lower than zero as a result of calculation, thereafter the calculation becomes incorrect. In order to solve the above problems, at step 106, it is determined if the quantity of particulates A calculated at step 105 is smaller than zero. When the result is affirmative, the quantity of collected particulates A is made zero at step 107.

Next, the routine goes to step 108, and it is determined if the quantity of collected particulates A is not higher than the predetermined value A0. When the result is negative, the routine is stopped. On the other hand, when the result at step 108 is affirmative, the routine goes to step 109, and it is determined if, on the basis of the output of the acceleration pedal stroke sensor 32 and the output of the engine speed sensor 31, the engine is decelerating. When the result is negative, the routine is stopped. On the other hand, when the result at step 109 is affirmative, the routine goes to step 110, and the closed first control valve is fully opened. Then the first control valve is fully closed again. This operation is repeated several times.

In the normal engine operation, the further quantity of particulates A1 collected by the filter is larger than the quantity of particulates A2 burned on the filter. Therefore, the quantity of particulates A collected by the filter is gradually increased. However, when the engine speed is relative high, the circumstances are reversed, and the quantity of particulates A collected by the filter is gradually decreased. It becomes lower than the predetermined value A0. In this way, the result at step 108 is affirmed. At this time, only ashes are mainly accumulated on the filter. When the first control valve 4*a* is opened and closed at step 110, pressure in the exhaust passage on the downstream side of each filter 5 is suddenly changed, so that a flow rate of exhaust gas passing through each filter 5 is suddenly changed. Therefore, ashes accumulated on the filter, which have been balanced in relation to the current difference of pressure between the upstream side and the downstream side of the filter and the current flow rate of exhaust gas, collapse by the sudden changes in the pressure difference and flow rate. Therefore, accumulated ashes are easily separated from the filter and discharged onto the downstream side via the meshes of the filter as shown in FIG. 2(B). This phenomenon also occurs in the case of collected particulates as well as ashes. This is referred to as a blow-off phenomenon which occurs in the collision collecting type filter. This blow-off phenomenon is not caused when the pressure difference between the upstream side and the downstream side changes gradually and also the flow rate of exhaust gas changes gradually, as in the normal engine operating condition.

In this embodiment, this blow-off phenomenon is positively utilized to remove ashes from the filter. However, it is not preferable to remove particulates from the filter by the blow-off phenomenon. Accordingly, only when the quantity of particulates A collected on the filter is smaller than the predetermined value A0, i.e., when the quantity of particulates A collected on the filter is very small, is the blow-off phenomenon made to occur. The first control valve 4*a* is opened and closed to cause the blow-off phenomenon when the engine is decelerating after the engine speed has become relative high, wherein the deceleration of engine speed is necessarily caused after the relative high engine speed. The reason why the first control valve 4*a* is opened and closed in the deceleration is described as follows. If the first control valve is opened and closed in other engine operating conditions, a quantity of recirculating exhaust gas is changed, so that the combustion is affected. On the other hand, in the deceleration, no fuel is fed and no combustion is conducted in each cylinder. Therefore, engine operation is not affected even if the quantity of recirculating exhaust gas is changed.

In a deceleration, the recirculation of exhaust gas is usually stopped. Accordingly, the first control valve 4*a* is fully opened. Consequently, in this embodiment, the closed first control valve 4*a* is fully opened and then is closed again, and this is repeated several times so that all ashes accumulated on the filter can be discharged by the plural times of occurrence of the blow-off phenomenon. However, it should be noted that the present invention is not limited to the specific embodiment. It is possible to decrease the quantity of ashes accumulated on the filter by only one occurrence of the blow-off phenomenon, and thus clogging of the filter caused by ashes can be prevented.

As described before, the blow-off phenomenon is caused in the collision collecting type filter when a difference of pressure in the exhaust passage 3 between the upstream side and the downstream side of the filter is suddenly changed. In particular, when this difference of pressure is suddenly increased, the blow-off phenomenon easily occurs. Therefore, as in this embodiment, if the first control valve arranged in the exhaust gas recirculating passage 4 connected with the exhaust passage 3 on the downstream side of each filter is changed from the fully closed condition to the fully open condition so that the pressure on the downstream side of the filter 5 is suddenly reduced, the blow-off phenomenon can be made to occur very easily. Of course, if the first control valve 4*a* is changed from the fully open condition to the fully closed condition, the pressure on the downstream side of the filter is suddenly increased. Therefore, the blow-off phenomenon can also be made to occur. Also, in the case where a single filter is arranged on the downstream side of the confluence section of the exhaust passage and the exhaust gas recirculating passage is connected with the upstream side of the filter, it is possible to suddenly decrease and increase the pressure on the upstream side of the filter by opening and closing of the control valve. Therefore, a difference of pressure between the upstream side and downstream side of the filter can be suddenly changed, and the blow-off phenomenon can be made to occur.

Figure 6:
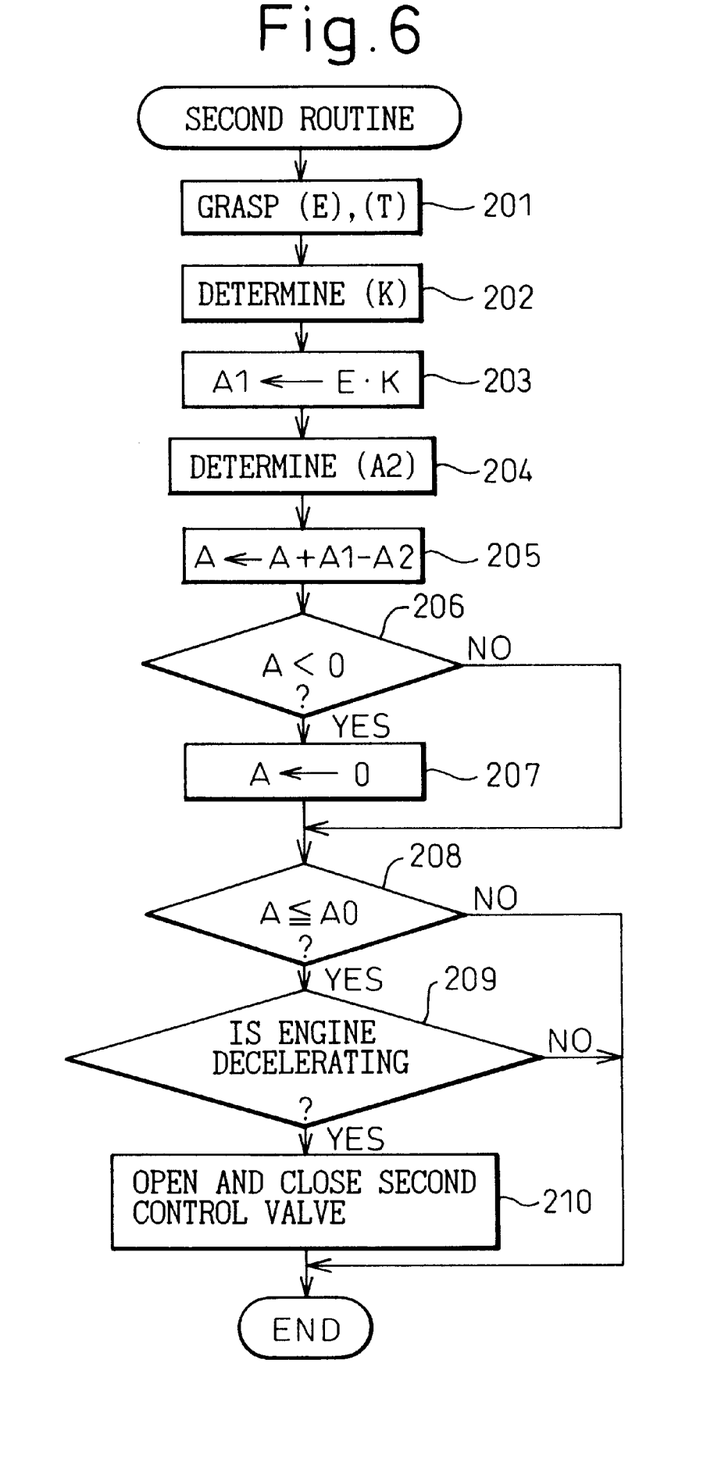
FIG. 6 is a second routine for removing ashes from the filter.

In order to make the blow-off phenomenon occur in this embodiment, instead of the first control valve 4*a* arranged in the exhaust gas recirculating passage 4, the second control valve 7*a*, which is arranged in the bypass passage 7 of the turbine 6 of the turbo-charger, may be opened and closed according to a second routine shown in FIG. 6. The second routine is similar to the first routine. When a quantity of exhaust gas is too large, the second control valve 7*a* is opened, so that the rotational speed of the turbine 6 can be prevented from increasing too much. Consequently, in a deceleration, the second control valve 7*a* is fully closed. At this time, if the second control valve 7*a* is fully opened, exhaust gas passes through the bypass passage 7, and no exhaust gas passes through the turbine which has a large exhaust resistance. Accordingly, the pressure in the exhaust passage 3 on the downstream side of the filter is suddenly decreased. When the second control valve 7*a* is fully closed again, exhaust gas passes through the turbine, so that the pressure in the exhaust passage 3 on the downstream side of the filter is suddenly increased. In both cases, a difference of pressure between the upstream side and the downstream side is suddenly changed, so that the blow-off phenomenon can be made to occur.

Figure 7:
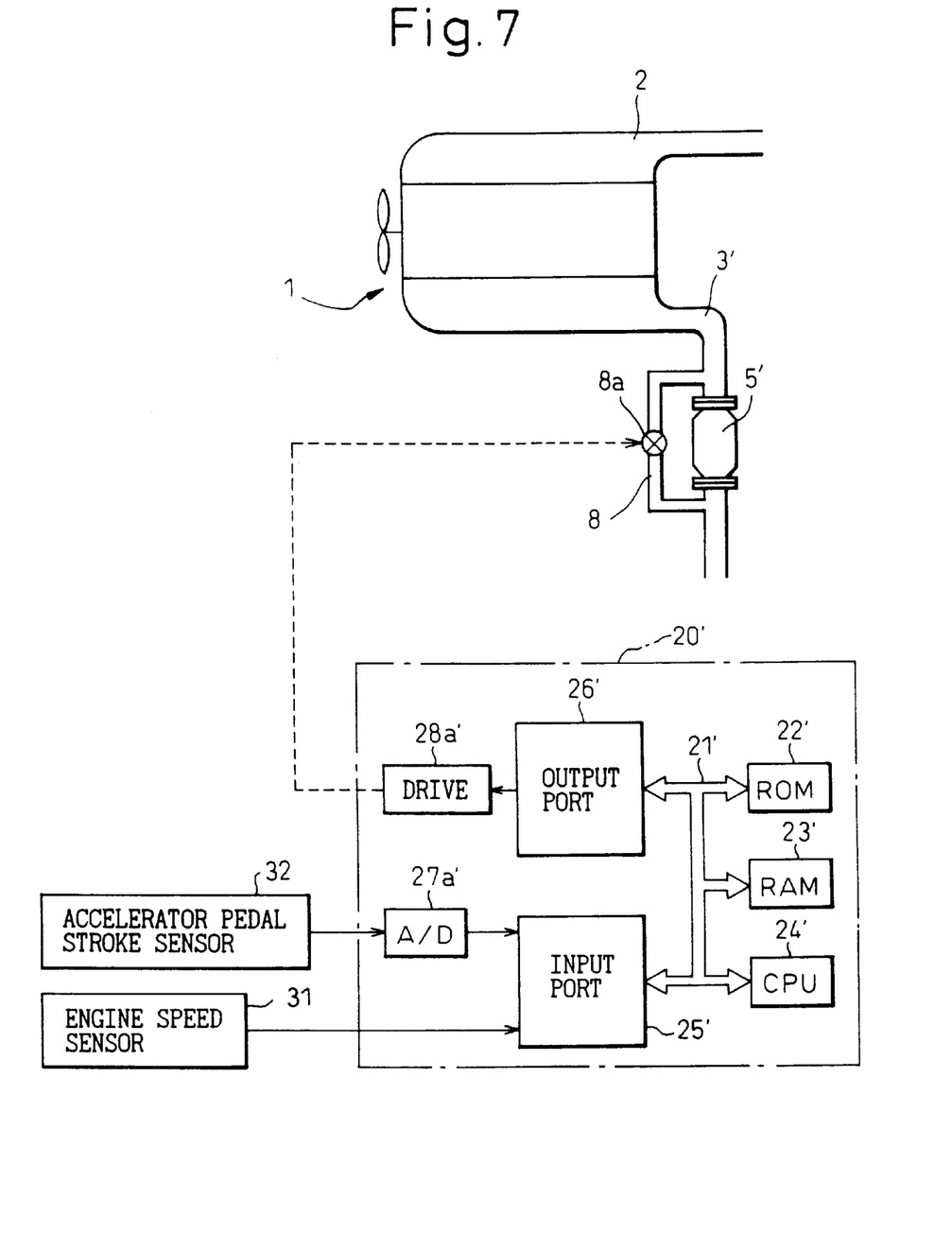
FIG. 7 is a schematic illustration of a diesel engine to which a device for purifying the exhaust gas of an internal combustion engine of the second embodiment of the present invention is attached.
Figure 8:
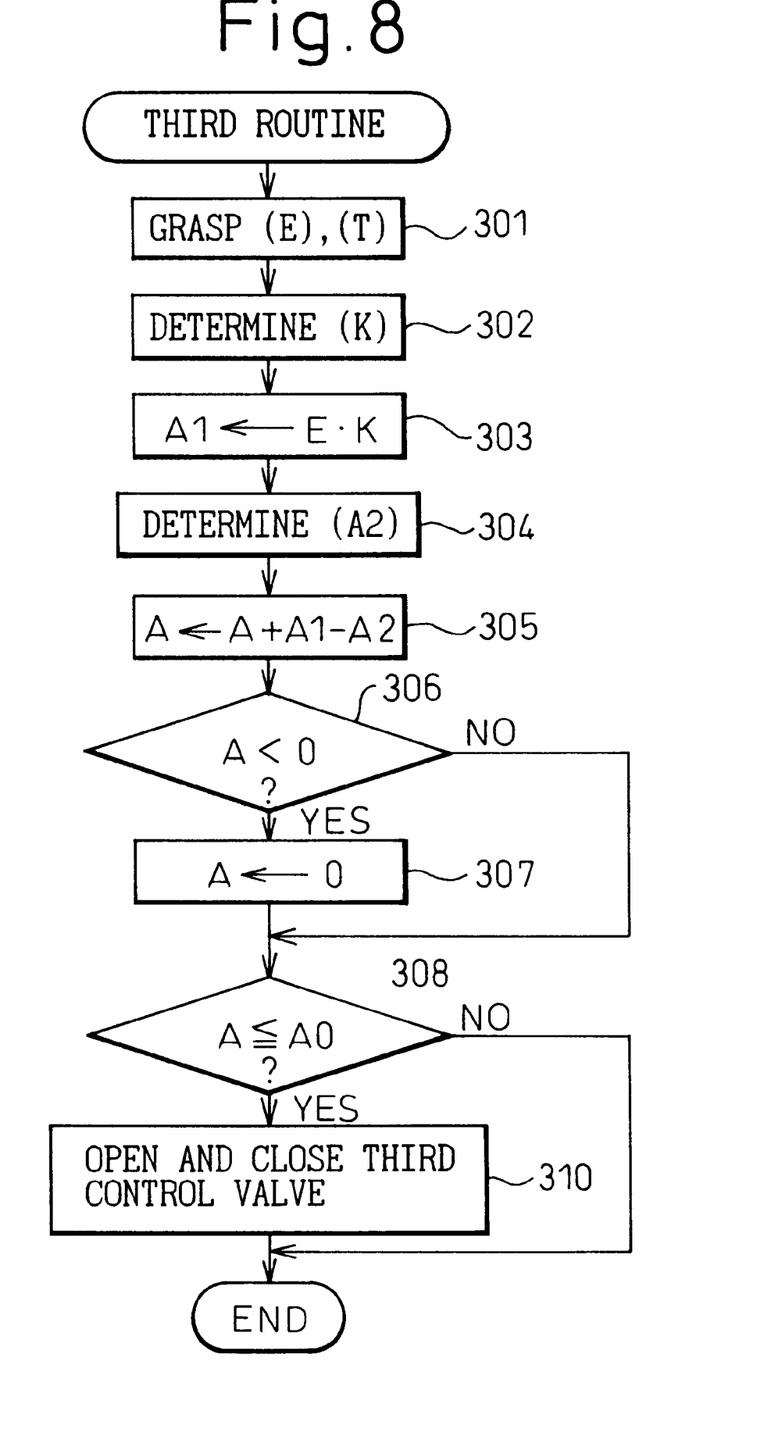
FIG. 8 is a third routine for removing ashes from the filter.

FIG. 7 is a schematic illustration of a diesel engine to which the device for purifying the exhaust gas of the second embodiment of the present invention is attached. In this embodiment, there is provided a single filter 5' in the exhaust passage 3' on the downstream side of the confluence section thereof. A bypass passage 8 of the filter 5' is connected with the exhaust passage 3'. In this bypass passage 8, the third control valve 8a is arranged.

In the device for purifying the exhaust gas composed as described above, the third control valve 8a is controlled by a control unit (ECU) 20', according to a third routine shown in FIG. 7. The ECU 20' is similar to the above-mentioned ECU 20. The third routine is similar to the first and second routines. A current quantity of particulates A collected by the filter 5' is calculated by the control unit 20'. When this quantity of particulates A becomes smaller than the predetermined value A0, in order to remove ashes from the filter 5' by the blow-off phenomenon, the third control valve 8a is changed from the fully closed condition to the fully open condition, and then it is fully closed again, and this operation is repeated several times.

When the third control valve 8a is fully opened, the pressure in the exhaust passage 3' on the upstream side of the filter is suddenly decreased. When the third control valve 8a is fully closed again, the pressure in the exhaust passage 3' on the upstream side of the filter is suddenly increased. In both cases, a difference of pressure between the upstream side and the downstream side is suddenly changed, so that the blow-off phenomenon can be made to occur.

If the blow-off phenomenon is caused at least one time in this embodiment, it is possible to considerably reduce a quantity of ashes accumulating on the filter. Therefore, it is possible to prevent the occurrence of clogging of the filter caused by accumulation ashes.

Both the exhaust resistance of the bypass passage 7 of the turbine 6 in the first embodiment and the exhaust resistance of the bypass passage 8 in the second embodiment are lower than the exhaust resistance of the corresponding portion of the exhaust passages 3 (a portion in which the turbine 6 or the filter 5' is arranged). Therefore, when the control valve arranged in such an bypass passage is opened, exhaust gas passes through the bypass passage so that it is possible to suddenly decrease the pressure on the upstream side or the downstream side of the filter in accordance with the connecting position of the bypass passage. When the control valve is closed again, exhaust gas passes through the corresponding portion of the exhaust passage 3, so that the decreased pressure in the exhaust passage 3 can be increased again. Thus, the blow-off phenomenon of the filter can be caused.

In the case of the bypass passage 8 in the second embodiment, even if exhaust gas passes through the bypass passage, the operation performance of the engine is not particularly affected. Therefore, unlike the first embodiment, the control valve does not need to be opened and closed only during a deceleration but can be operated at any time, and thus it is possible to cause the blowoff phenomenon immediately when the quantity of collected particulates becomes smaller than the predetermined value.

Although the invention has been described with reference to specific embodiments thereof, it should be apparent that numerous modifications can be made thereto by those skilled in the art without departing from the basic concept and scope of the invention.

We claim:

1. A device for purifying the exhaust gas of an internal combustion engine comprising:
    a collision collecting type filter for collecting particulates which is arranged in an exhaust passage of said engine;
    a pressure variable means which can vary a pressure in said exhaust passage on at least one of the upstream side and downstream side of said filter;
    a regeneration determining means for determining that the collected particulates have been burned and said filter has been regenerated; and
    a pressure changing means for suddenly changing said pressure in said exhaust passage by said pressure variable means when it is determined that said filter has been regenerated by said regeneration determining means.

2. A device according to claim 1, wherein said pressure changing means suddenly increases a pressure in said exhaust passage on the upstream side of said filter by said pressure variable means.

3. A device according to claim 1, wherein said pressure changing means suddenly decreases a pressure in said exhaust passage on the downstream side of said filter by said pressure variable means.

4. A device according to claim 1, wherein said pressure variable means is a control valve arranged in an exhaust gas recirculating passage which communicates said exhaust passage with the intake passage of said engine.

5. A device according to claim 4, wherein said exhaust gas recirculating passage communicates said exhaust passage on the downstream side of said filter with said intake passage.

6. A device according to claim 5, wherein said filter is arranged for every cylinder on upstream side of a confluence section of said exhaust passage.

7. A device according to claim 1, wherein said pressure variable means is a control valve arranged in a bypass passage connected with said exhaust passage, and an exhaust resistance of said bypass passage is lower than that of the exhaust passage portion corresponding to said bypass passage.

8. A device according to claim 7, wherein said filter is arranged on the upstream side of said bypass passage.

9. A device according to claim 7, wherein said bypass passage bypasses a turbo-charger turbine.

10. A device according to claim 1, wherein said regeneration determining means grasps a current quantity of particulates collected by said filter on the basis of an integration value of a difference between a further quantity of particulates collected by said filter and a quantity of particulates burned on said filter and determines that said filter has been regenerated when said current quantity of particulates collected by said filter becomes smaller than a predetermined value.

* * * * *